United States Patent [19]

Grundy

[11] 3,890,577

[45] June 17, 1975

[54] VITAL ACTIVE LOW-PASS FILTER

[75] Inventor: Reed H. Grundy, Murrysville, Pa.

[73] Assignee: Westinghouse Air Brake Company, Swissvale, Pa.

[22] Filed: Aug. 15, 1973

[21] Appl. No.: 388,372

[52] U.S. Cl. .................... 330/31; 330/51; 328/167
[51] Int. Cl. .................... H03f 3/04
[58] Field of Search .......... 330/21, 31, 51; 328/167

[56] References Cited

UNITED STATES PATENTS

| | | | |
|---|---|---|---|
| 3,296,546 | 1/1967 | Schneider | 330/31 X |
| 3,408,507 | 10/1968 | Martin | 307/202 X |
| 3,769,606 | 10/1973 | Henegar | 330/51 X |
| 3,774,125 | 11/1973 | Condon et al. | 328/167 X |

OTHER PUBLICATIONS

Burrows, "Ceramic Pickups and Transistor Pre-Amplifiers," Wireless World 2/70 pp. 56–60, 80.

*Primary Examiner*—James B. Mullins
*Attorney, Agent, or Firm*—J. B. Sotak; R. W. McIntire, Jr.

[57] ABSTRACT

This invention relates to a fail-safe variable type of low-pass filtering circuit. The filtering circuit includes a passive R-C network and an active semiconductive amplifying stage. The upper transmission frequency of a.c. input signals is varied by changing the resistance of the R-C network.

10 Claims, 2 Drawing Figures

PATENTED JUN 17 1975

3,890,577

VITAL ACTIVE LOW-PASS FILTER

This invention relates to a vital selectable signal frequency filtering circuit and more particularly to a fail-safe active low-pass filter employing an incrementally variable resistance-capacitance (R-C) network for establishing the rolloff or cutoff frequency of a.c. signals which are applied to and amplified by a transistor amplifier stage.

In certain types of signal and communication systems for use in mass and/or rapid transit operation, it is common practice to employ cab signals to control the speed of a vehicle or train as it moves along its route of travel. Generally, the cab signals, that are conveyed to the vehicle or train, are in the form of coded carrier wave forms. That is, a carrier wave signal is selectively coded at one of a plurality of code rates. Each code rate signifies a given maximum speed at which a vehicle or train is permitted or authorized to travel along a particular section of trackway. In practice, the coded carrier signals are normally fed to the track rails and are picked up by inductive coils which are mounted on the front end of the vehicle or train. The induced signals are amplifed, demodulated, shaped, filtered and decoded, and then the recovered signals are applied to the decoder or decoding unit which controls the state or condition of a plurality of decoding relays. One essential and necessary function in a cab signaling operation is for the car-borne equipment to sense for overspeed conditions. When the actual speed of a moving vehicle or train exceeded the authorized speed permitted in a given track section or restricted area, an overspeed signal is produced onboard a violating vehicle. Normally, this speed check is accomplished by the overspeed control package. A tachometer in the form of a frequency generator produces signals which are proportional to the actual speed of the moving vehicle. Previously, the decoding relays completed a circuit path from the frequency generator through a selected one of a plurality of individual electrical filters in accordance with the last received speed command signal. It will be understood that the number of electrical filters was dependent upon the number of discrete speeds employed in the particular cab signaling system. Each filter was generally made up of four (4) sections with an isolation stage located between each section. These previous frequency filtering circuits were very costly to construct due to the excessive number of electrical components which were required to be used and assembled. The design of these previous filters presented further difficulties in that multiple adjustments were required in maintaining accuracy of the circuit components. In addition to the costlines these prior filtering circuits were relatively large and bulky which meant they were heavy and thus requiring more storage space. Thus, the optimum type of frequency filtering circuits for cab signaling equipment should be as simple as possible in order to minimize purchase and maintenance costs and to maximize space, weight and reliability considerations.

Accordingly, it is an object of this invention to provide a fail-safe active multi-frequency responsive filtering circuit for using in cab signaling equipment for mass and/or rapid transit operation.

A further object of this invention is to provide a vital electronic signal frequency filtering circuit having a variable R-C network and an amplifying circuit.

Another object of my invention is to provide a novel active low-pass filter employing an adjustable resistance-capacitance network feeding a semiconductive amplifying circuit.

Still a further object of this invention is to provide a vital type of an electronic low-pass filtering circuit having a variable passive network and an active amplifying circuit.

Still another object of this invention is to provide a unique variable active R-C filtering circuit which operates in a fail-safe manner.

Yet a further object of this invention is to provide a new and improved selectable low-pass filter employing a passive R-C network and an active amplifier.

Yet another object of this invention is to provide a vital type of an active low-pass filter employing a resistance-capacitance network for changing the rolloff frequency by varying the value of resistance of the resistance-capacitance network.

An additional object of this invention is to provide a fail-safe active low-pass filtering circuit which is economical in cost, simple in design, reliable in operation, durable in use and efficient in service.

In accordance with the present invention, the vital or fail-safe low-pass electronic filtering circuit includes a passing R-C network and an active amplifying circuit. The passive R-C network includes a single L section made up of a selected one of a plurality of resistors in combination with a four-terminal capacitor. The amplifying circuit includes an NPN transistor connected in a common emitter configuration. The base electrode of the transistor amplifier is coupled to the four-terminal capacitor via a coupling capacitor. A voltage divider including a pair of series connected resistors is coupled across a source of d.c. supply voltage. The base electrode is directly connected to the junction of the voltage divider for forwardly biasing the NPN transistor. The emitter electrode is coupled to ground via an emitter resistor. The collector electrode is connected to the positive terminal of the d.c. supply voltage via a load resistor. An a.c. output signal having an upper cutoff frequency determined by the resistance-capacitance values of the R-C network is derived from the collector electrode of the NPN transistor amplifier.

The foregoing objects and other additional features and advantages of my invention will become more fully evident from the foregoing detailed description when considered in conjunction with the accompanying drawings wherein.

Figure 1:
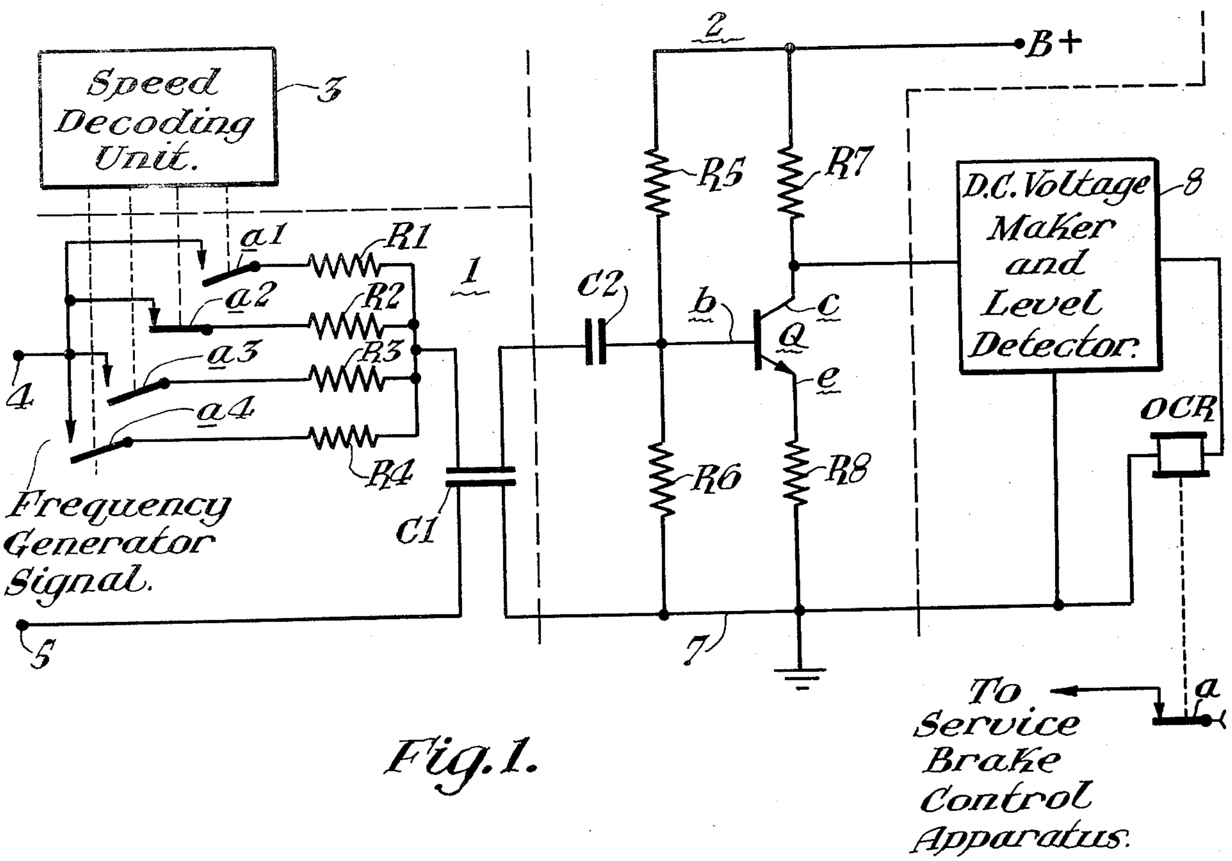
FIG. 1 is a schematic circuit diagram illustrating a preferred embodiment of the vital filtering circuit arrangement of the present invention.

Referring now to the drawings, and in particular to FIG. 1, there is shown a portion of the overspeed control apparatus for a cab signaling system employing the vital or fail-safe signal frequency filtering circuit of the present invention. The filtering circuit of FIG. 1 includes a single section resistance-capacitance network and a semiconductive or solid state amplifying circuit. That is, in actual practice the vital electronic low pass filter is basically made up of the passive resistance-capacitance R-C network 1 and the active transistorized amplifier circuit 2.

As shown, a selected one of a plurality of resistors R1, R2, R3, and R4, respectively, forms the resistive arm of the R-C network 1 while a four-terminal capacitor C1 forms the reactive arm of the R-C network 1. As shown in the present instance, the resistor R2 is effectively connected to one of a pair of a.c. input terminals 4 and 5 by front contact *a*2. Thus, a circuit path is established from input terminal 4, through front contact *a*, through resistor R2, through one pair of terminals of the four-terminal capacitor C1 to the input terminal 5. The a.c. signals on terminals 4 and 5 are produced by a suitable speed sensor, such as, an axle driven generator, so that the frequency is directly proportional to the actual speed of the moving vehicle. The position of movable front contact *a*2 is controlled by the vehicle-carried speed decoding unit 3. As previously mentioned, coded cab signals are picked up from the track rails by inductive pickup means and are demodulated, amplified, shaped, limited, and decoded by the cab signal equipment. The speed decoding unit 3 of the cab signal equipment includes a plurality of electromagnetic decoding relays which are energized or deenergized in accordance with the code rate of frequency of the various received coded cab signals. Thus, front contacts *a*1, *a*2, *a*3 or *a*4 are either opened or closed in accordance with the electrical condition of its associated electromagnetic relay. That is the energized and deenergized decoding relays of the decoding unit 3 function to effectively establish a completed circuit path to only one of the plurality of resistors R1, R2, R3, or R4. Thus the circuit path is selectively completed to one of the respective resistors R1, R2, R3 and R4 by one of the associated front contacts *a*1, *a*2, *a*3, or *a*4, respectively. In the present instance, the resistive value of the resistors R1, R2, R3, and R4 have been chosen to be progressively higher in value. That is, resistor R1 is less than the value of resistor R2, resistor R2 is less than the value of resistor R3, and the value of resistor R3 is less than the value of resistor R4. Further, it has been found to be necessary to select the values of the input resistors to be a linear function of the speed.

As shown, the other pair of terminals of the four-terminal capacitor C1 is coupled to the input of the semiconductive or solid-state amplifier circuit 2. The amplifier 2 includes a single NPN transistor Q connected in a common emitter configuration. The transistor Q includes an emitter electrode *e*, a collector electrode *c*, of a base electrode *b*. The base electrode *b* is coupled to one of the other terminals, namely, the upper plate of the four-terminal capacitor C1 via coupling capacitor C2. As shown, a voltage divider including series connected resistors R5 and R6 provides the d.c. biasing potentials for the amplifying transistor Q. That is, the upper end of the resistor R5 is coupled to the positive voltage terminal B+of a suitable source of d.c. supply voltage (not shown). The lower end of the resistor R6 is connected to a reference potential such as ground lead 7. The base electrode *b* of transistor Q is directly connected to the junction point of the voltage dividing resistors R5 and R6. The collector electrode *c* of transistor Q is connected to the positive terminal B+ via load resistor R7. The emitter electrode *e* of transistor Q is connected to the ground lead 7 via resistor R8. The amplified output signals are derived from the collector electrode *c* of transistor Q. As shown, the collector electrode *c* is connected to a vital type of a d.c. voltage maker and level detector 8.

The fail-safe d.c. voltage maker may be of the type shown and disclosed in Letters Patent of the U.S. Pat. No. 3,527,986, namely, amplifier 9 and rectifier 21, as illustrated in FIG. 2*a*, and the level detector may be similar to the type shown and disclosed in copending application for Letters Patent of the U.S., Ser. No. 1,970, filed Jan. 12, 1970, for Fail-Safe Circuit Arrangement, by John O. G. Darrow, which is assigned to the assignee of the present application. Briefly, the d.c. voltage maker is a fail-safe amplifier-rectifier circuit in which no critical circuit or component failure is capable of increasing the gain characteristics of the circuit. Briefly, in practice, the amplifier includes two transistor amplifying stages. The amplified output from the amplifier is applied to a fail-safe voltage rectifier and voltage doubling circuit which converts the a.c. signals into a d.c. voltage. The output of the amplifier-rectifier is then applied to the input of the fail-safe level detector. The fail-safe level detector 8 includes a feedback type of oscillator circuit and a voltage breakdown device. The oscillator employs a transistor amplifier and a frequency determining circuit which is interconnected with the voltage breakdown device for controlling the amount of regeneration and, in turn, the oscillating condition of the oscillator. In operation, the voltage breakdown device normally exhibits the high dymanic impedance and only assumes a low dynamic impedance when a sufficient d.c. voltage causes the device to break down and conduct. Thus, the oscillating circuit will only produce a.c. oscillations when the d.c. voltage exceeds a predetermined amplitude, thereby causing the voltage breakdown device to exhibit a low impedance so that sufficient regenerative feedback is provided for sustaining osciallation. The a.c. oscillating signals are applied to the coil of the overspeed control relay OSR. It will be noted that the overspeed control relay OSR includes at least one contact, namely front contact *a* which controls the circuit condition of the service brakes of the vehicle or train. As shown, the front contact *a* is opened due to the deenergization of the overspeed control relay OSR. Thus, the circuit to the brake control is interrupted and the emergency brakes are applied. As will be described in detail hereinafter, the front contact *a* is made by the energization of the overspeed control relay OSR which results in the completion of the service brake control circuit. Thus, the brakes will be applied when the overspeed relay OSR is deenergized and the vehicle will begin to decelerate.

Turning now to the operation of the present invention, it will be assumed that all the components and elements are intact and that the filtering circuit and the entire cab signaling system is operating properly. Further, let us assume that the present code rate being received onboard the vehicle is effective in energizing the appropriate code following relay of decoding unit 3 for picking up the front contact *a*2. It will be appreciated that only one of the decoding relays may be energized at any given time so that under the assumed condition front contact *a*2 is closed while the front contacts *a*1, *a*3, and *a*4 are opened. Thus, under this assumed condition the resistor R2 and the capacitor C1 are being supplied with a.c. input signals from the axle driven frequency signal generator which is connected to input terminals 4 and 5. Thus, the resistance R2 and the capacitor C1 form a low-pass filter circuit having the voltage-frequency characteristics shown by curve 1*b* of FIG. 2. It will be observed that the frequency response of the filter is initially flat or level so that substantially all of the low frequency signals produced by the tachometer or frequency generator are passed by resistor R2 and capacitor C1. Accordingly, the input signals are amplified by the transistor amplifier Q and are applied to the d.c. maker voltage and level detector 8. Under this condition, the output of the circuit 8 is employed to energize the overspeed relay OSR. Thus, the front contact *a* of relay OSR remains closed so long as relay OSR is picked up. Hence, the circuit to the service brake control apparatus is continuous so that the application of the service brakes is precluded.

Figure 2:
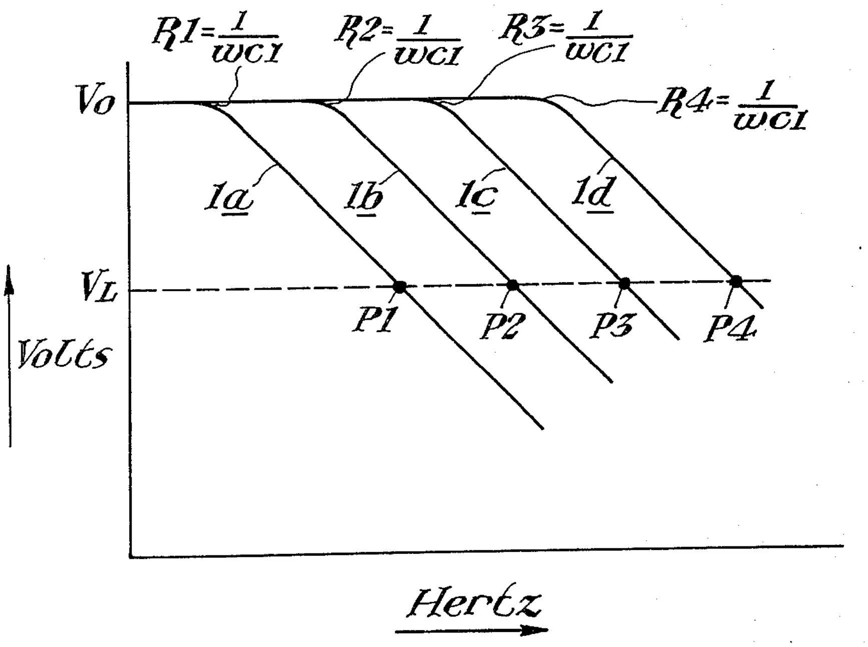
FIG. 2 is a graphic illustration of the frequency response characteristics of the circuit of FIG. 1.

When the frequency of the tachometer reaches a given value, the voltage level will not remain constant but will follow the curve 1*b*. When R2 = 1/wC1, the half power point, the attenuating characteristics of the circuit change so that output voltage Vo will decrease as shown in FIG. 2. That is, the filter exhibits a transmission bandwidth from approximately zero (0) frequency to a specified upper frequency, namely, 1/2IIR2Cl is illustrated in the drawings. At this point, rolloff or cutoff is exhibited by the filter so that an attenuating effect occurs for higher frequencies. It will be noted that the slope of the curve is representative of the rate of attenuation which, in this case, is 6 db per octave, or 20db per decade. It will be noted that the amplitude of the output voltage Vo continues to decrease as the frequency increases. At a given point, namely, point P2, the amplitude of the output voltage intersects the voltage level VL which is proportional to the zener or breakdown voltage of the level detector circuit 8. Thus, at approximately point P2 output voltage Vo is less than the detection voltage level $V_L$ so the zener diode is rendered nonconductive. Hence, no signal voltage is available for the overspeed relay OSR and thus the contact *a* is released and opened. Thus, the circuit to the brake control apparatus is opened and the service brakes of the vehicle are applied to bring the vehicle within the authorized speed command level for the given area. The relay will remain deenergized and the contact *a* will remain opened so long as the frequency of the signal produced by the tachometer is above the frequency of the point P2. Thus, an overspeed condition is readily recognized by the circuit to allow ready control of the vehicle at all times.

It will be appreciated that when the speed decoding unit receives one of the other speed command signals, the front contact *a*2 will be immediately opened and one of the other front contacts *a*1, *a*3, or *a*4 will become closed so that attenuating curve 1*a*, 1*c*, or 1*d* will be controlling. It will be noted that curves 1*a*, 1*c* and 1*d* are similar to curve 1*b* except the rolloff or cutoff frequency of these former curves occurs at a different frequency. That is, the rolloff frequency of curve 1*a* is less than that of curve 1*b* while the rolloff frequencies of curves 1*c* and 1*d* are higher than that of curve 1*b*. It will be observed that curve 1*a* has a rolloff at R1 = 1/WCl, and that the half-power points for curves 1*c* and 1*d* are R3 = 1/WC, and R4 = 1/wc, respectively. In addition, it will be noted that point P1 occurs at a lower frequency than point P2 and that points P3 and P4 occur at a higher frequency than point P2.

Thus, it can be seen that a single section low-pass filter employing one of a plurality of selected resistors in combination with a single four-terminal capacitor may be employed to effectively vary the frequency response of the presently described fail-safe filter circuit. While four distinct speed commands have been described, it will be appreciated that a greater or lesser number of speed commands may be readily accommodated by the presently described invention. In addition, it will be appreciated that the resistive values of the resistor arms of the R-C network may be varied depending upon the particular application.

Additionally, it will be noted that the circuit operates in a fail-safe fashion in that no critical component or circuit failure is capable of increasing the particular rolloff frequency of any of the filter combinations. It will be appreciated that it is necessary to employ certain precautionary measures in regard to the circuit design as well as to the selection of components. For example, resistors of the R-C network are preferably constructed of a carbon composition so that they are incapable of becming short circuited. The circuit is meticulously designed and laid out to ensure that leads in proximity of each other are incapable of touching each other to create a short circuit. The use of the four-terminal capacitor Cl ensures that the loss of a lead will not cause an unsafe condition. In addition, it will be noted that failure of the other passive elements as well as the active transistor results in elimination of the necessary biasing and operating potentials or destroys the amplifying characteristics of the transistor so that an unsafe condition, namely, a higher than normal level of voltage is not capable of being applied to the d.c. voltage maker and level detector circuit 8.

It will be appreciated that while the present invention finds particular utility in cab signaling equipment and, in particular to a speed command control arrangement, it is understood that the invention may be employed in other equipment and apparatus which have need for such operation.

In addition, it will be readily evident that this invention may be employed in other various systems and apparatus, such as, security circuits and equipment which require the vitality and safety inherently present in this invention.

Additionally, it will be understood that other changes, modifications and alterations maybe employed without departing from the spirit and scope of this invention. For example, the NPN transistor may be replaced by a PNP transistor simply by changing the polarity of the d.c. supply voltage. In addition, it will be appreciated that other types of decoding units and d.c. makes and level detectors may be employed in practicing the present invention. Thus, it is understood that the showing and description of the present invention should be taken in an illustrative or diagrammatic sense only.

Having now described the invention, what I claim as new and desire to secure by Letters Patent, is:

1. A vital signal frequency filtering circuit comprising, a source of a.c. signals, a fail-safe variable passive R-C network having a plurality of individual resistors and a four-terminal capacitor coupled to said source of a.c. signals, and an active amplifying circuit having its input supplied by said fail-safe passive R-C network and having its output developing a range of frequencies which is dependent upon the resistance and capacitance values of said fail-safe passive R-C network.

2. A vital signal frequency filtering circuit as defined in claim 1, wherein said fail safe variable passive R-C network is a low-pass filter.

3. A vital signal frequency filtering circuit as defined in claim 1, wherein the resistance value of said fail safe passive R-C network is varied in order to change the range of frequencies.

4. A vital signal frequency filtering circuit as defined in claim 1, wherein said four-terminal capacitor of said fail-safe passive R-C network has a first pair of terminals coupled to said source of a.c. signals and has a second pair of terminals coupled to the input of said active amplifier circuit.

5. A vital signal frequency filtering circuit as defined in claim 1, wherein said active amplifying circuit includes a semiconductive device.

6. A vital signal frequency filtering circuit as defined in claim 5, wherein said semiconductive device is an NPN transistor.

7. A vital signal frequency filtering circuit as defined in claim 1, wherein said active amplifying circuit includes a transistor connected in a common emitter configuration.

8. A vital signal frequency filtering citcuit as defined in claim 7, wherein a voltage divider includes a pair of series connected resistors for forwardly biasing said transistor.

9. A vital signal frequency filtering circuit as defined in claim 1, wherein a coupling capacitor is interconnected between said fail safe passive R-C network and the input of said active amplifying circuit.

10. A vital signal frequency filtering circuit as defined in claim 6, wherein the emitter electrode of said NPN transistor is connected to ground via an emitter load resistor, the collector electrode of said NPN transistor is connected to a positive d.c. supply terminal via a collector load resistor, and the base electrode of said NPN transistor is connected to the junction of a voltage dividing network which includes a pair of resistors connected between ground and the positive d.c. supply terminal.

* * * * *